(12) United States Patent
Miller et al.

(10) Patent No.: US 6,619,127 B2
(45) Date of Patent: Sep. 16, 2003

(54) STRUCTURAL TEST SOFT SUPPORT SYSTEM

(75) Inventors: Mark E. Miller, Redondo, WA (US); John J. Valko, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 43 days.

(21) Appl. No.: 10/041,441

(22) Filed: Jan. 8, 2002

(65) Prior Publication Data

US 2003/0126929 A1 Jul. 10, 2003

(51) Int. Cl.[7] ................................................. G01M 7/06
(52) U.S. Cl. ........................ 73/663; 73/583; 244/114 R
(58) Field of Search .......................... 73/583, 663, 665; 244/114 R; 254/45

(56) References Cited

U.S. PATENT DOCUMENTS 6,422,511 B1 * 7/2002 Kalisz .................... 244/114 R

* cited by examiner

*Primary Examiner*—John E. Chapman
(74) *Attorney, Agent, or Firm*—Harness Dickey & Pierce P.L.C.

(57) ABSTRACT

A support system for ground vibration testing of a large flexible structure. The system includes a plurality of light weight lifting mechanisms that impart an upward force sufficient to lift the flexible structure off the ground. The system also includes a plurality of lift beams coupled to the lifting mechanisms in a pendulous manner. Each lift beam attaches to the flexible structure at one of a plurality of designated jack points, and lifts the flexible structure off the ground when the upward force is imparted by the lifting mechanisms. Thus, the flexible structure is thereby pendulously suspending above the ground such that rigid body mode test data is decoupled from first flexible mode test data.

20 Claims, 3 Drawing Sheets

STRUCTURAL TEST SOFT SUPPORT SYSTEM

FIELD OF INVENTION

The invention relates generally to ground vibration testing of large flexible structures, such as aircraft. More specifically, the invention relates to a structural test soft support system that allows resulting rigid body test mode data to be separated, or decoupled, from first flexible mode test data.

BACKGROUND OF THE INVENTION

The purpose of a ground vibration test is to verify complex vibration analyses, or alternately, to determine important vibration characteristics of a structure. Prior testing has shown that it is very likely that a ground vibration test will produce results which will be contaminated by a series of unknown non-linearities within the structure and, often more significantly, by the effects of the test support system non-linearities, stiffness and mass.

A successful ground vibration test of a flexible structure requires an analytically determinant definition of the test structure supports referred to as test boundary conditions. This is an absolute requirement because the effects of the test support system must be removed in order to allow an understanding of the test structure alone.

For aircraft ground vibration tests, an ideal "soft support system" would position the aircraft with a boundary condition that is consistent with the simulation of an aircraft in flight. Additionally, the ideal support system would support the aircraft so that the test rigid body mode frequencies, defined as the interaction frequencies of the aircraft structural weight and inertia with the soft support system stiffness, are well below the first flexible modes of the structure. The most important flexible structural modes that contribute to potential critical aeroelastic phenomena have frequencies which occur just above the rigid body mode frequencies. The engineering objective is to tune the highest occurring rigid body mode, using frequency as a guide, to be separated from the lowest flexible structural mode frequency.

At least one known soft support system for aircraft ground vibration tests has included various spring and spring supported platforms that have been placed below each landing gear after jacking up the aircraft to provide clearance below the landing gear. The platforms are interfaced with the landing gear and then released from the supporting or grounding devices. These soft support systems have been fairly successful, but have been limited by three factors. One limiting factor is the excessive mass of the soft support system due to the geometry and strength design requirements. Known soft support systems have platforms that are placed under each landing gear tire assembly. The platforms are quite large and typically weigh several thousand pounds. As the mass of the soft support system approaches a noticeable percentage of the aircraft weight, the tested aircraft dynamic behavior is altered and contamination occurs in the data. This makes analysis model verification using the test results more time consuming to correlate, and more ambiguous, and often not possible to interpret correctly.

A second limiting factor of known soft support systems is the difficulties incurred due to tire stiffness nonlinearities. With the tires under load and in series with the soft support system during the test, an amplitude varying nonlinear stiffness is introduced into the test results. Nonlinear effects are very difficult to model using known analysis techniques. It is very important to make the test configuration and supports as linear as possible so that analysis model verification can be performed.

A third limiting factor of known soft support systems is an adverse effect on test flow time due to the significant time required for soft support system setup. In known soft support systems a significant amount of time consumption occurs during set-up of the soft support system. When the entire aircraft is jacked up sufficiently to place the platforms under the tires, time consuming diligent care must be taken so that the platforms are placed properly. It is not uncommon to have to re-jack the aircraft to improve the location of the platforms during a test. Therefore, data acquisition time is often compromised by time lost during soft support system placement.

The standard approach is to allow enough time for the setup of the system prior to dedicated test time, and to allow additional time during the test to analyze the data to ensure there is no contamination in the data due to soft support related difficulties. Thus, typical known soft support system approaches are conservative and time consuming. Time is very expensive and the importance of reducing the risk of acquiring contaminated or incorrect data during a certification related test can not be overemphasized.

Other known soft support system approaches have utilized methods that reduce the stiffness of the boundary condition by running a single tire from each landing gear up on a ramp. The tire pressure is then reduced to get as soft a system as possible while on tires. The overloaded tire is significantly non-linear and is problematic to define, thereby making the results from this type of test difficult to interpret. Often an engineer will spend thousands of hours hoping to verify the model. Due to the nonlinearities the results are often ambiguous and leave the certification analysis validation of the aircraft in question.

Therefore, it would be desirable to provide a soft support system that eliminates the risks to test data associated with known ground vibration test support systems. Specifically, it would be desirable to provide a structural test soft support system that supports a flexible structure, i.e. an aircraft, such that testing produces data wherein the undesirable test rigid body mode data caused by the test support structure is well below the desirable first flexible mode data of the structure under test, thereby allowing the rigid body mode data to be decoupled from the first flexible mode data.

BRIEF SUMMARY OF THE INVENTION

In one preferred embodiment, the present invention provides a support system is provided for ground vibration testing of a large flexible structure. The system includes a plurality of light weight lifting mechanisms that impart an upward force sufficient to lift the flexible structure off the ground. The system also includes a plurality of lift beams coupled to the lifting mechanisms in a pendulous manner. Each lift beam attaches to the flexible structure at one of a plurality of designated jack points, and lifts the flexible structure off the ground when the upward force is imparted by the lifting mechanisms. Thus, the flexible structure is thereby pendulously suspended above the ground such that rigid body mode test data is decoupled from first flexible mode test data.

In another preferred embodiment, a method is provided for structurally testing a flexible structure using a soft support system. The system includes a plurality of light weight lifting mechanisms and a plurality of lift beams pendulously coupled to the lifting mechanisms. The method includes attaching the lift beams to the flexible structure at designated jack points, and pendulously suspending the flexible structure above the ground utilizing the lift beams such that rigid body mode test data is separated from first flexible mode test data.

In yet another preferred embodiment, a support system is provided for ground vibration testing of an aircraft having a plurality of land gears comprising a landing gear strut and a plurality of tires. The system includes a plurality of fluid pressure canisters capable of imparting an upward force sufficient to lift the aircraft at each landing gear strut. Additionally, the system includes a plurality of hanger beams having a first end coupled to one of the fluid pressure canisters and an opposing second end coupled to another of the fluid pressure canisters. Furthermore, the system includes a plurality of hanger rods coupled to the hanger beams such that a proximal end of each hanger rod is pendulously coupled to a respective hanger. Still further, the system includes a plurality of lift beams connected to the hanger rods such that one lift beam is connected to the distal ends of two hanger rods. Each lift beam attaches to one of the landing gears between the tires such that the aircraft is pendulously suspended above the ground when the fluid pressure canisters impart the upward force, thereby allowing test data to be produced such that rigid body mode test data can be separated, or decoupled, from first flexible mode test data.

BRIEF DESCRIPTION OF THE DRAWINGS

The present invention will become more fully understood from the detailed description and accompanying drawings, wherein.

DETAILED DESCRIPTION OF THE INVENTION

Figure 1:
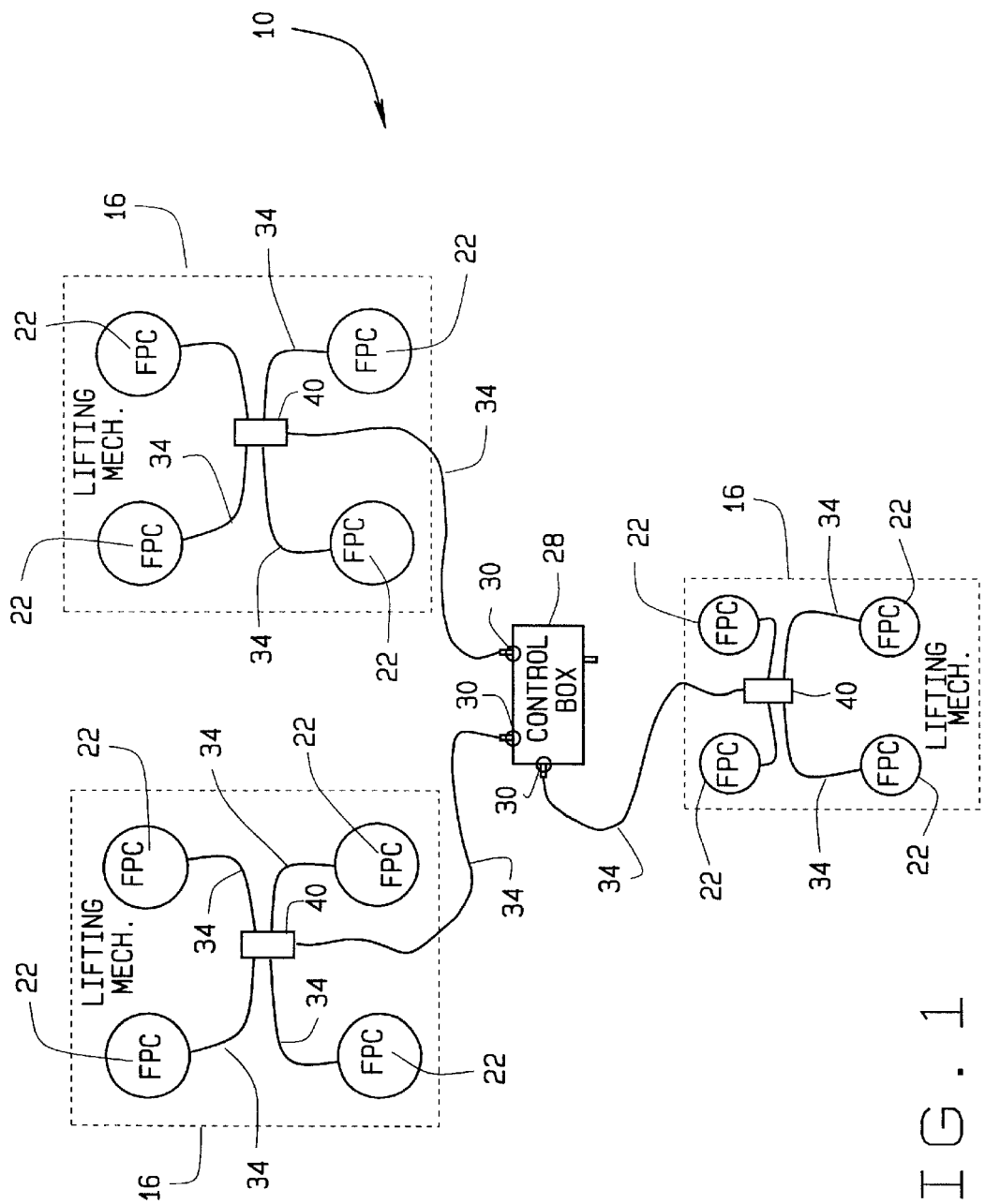
FIG. 1 is a schematic of a structural test soft support system used in accordance with a preferred embodiment of the present invention.

FIG. 1 is a schematic of a structural test soft support system 10 used in accordance with a preferred embodiment of the present invention. System 10 is used to support a large flexible structure (not shown), such as an aircraft, during ground vibrations testing. System 10 includes a plurality of light weight lifting mechanisms 16 capable of imparting an upward force sufficient to lift the flexible structure off the ground. Each lifting mechanism 16 includes a plurality of fluid pressure canisters 22 that are filled with a fluid, such a air, water or a gas, to produce a pressure inside fluid pressure canisters 22. The fluid pressure is utilized by lifting mechanisms 16 to provide the upward force.

System 10 also includes a control box 28 and a plurality of fluid communication conduits 34. Fluid communication conduits 34 connect control box 28 to each lifting mechanism 16 and interconnect each fluid pressure canister 22 within each lifting mechanism 16. This allows fluid communication between control box 28 and lifting mechanisms 16, and between fluid pressure canisters 22. Control box 28 includes at least one regulator 30 for each lifting mechanism. Regulators 30 are utilized by control box 28 to regulate fluid communications between control box 28 and lifting mechanisms 16.

In one preferred embodiment, each lifting mechanism includes a distribution device 40 which interconnects fluid pressure canisters 22 within each lifting mechanism 16. In this embodiment, a conduit 34 is connected between control box 28 and distribution device 40, and a plurality of conduits 34 are connected between distribution device 40 and each fluid pressure canister 22 within each lifting mechanism 16. Control box 28 provides and controls fluid communications between control box 28 and each lifting mechanism 16 by fluidly communicating with distribution device 40. Distribution device 40, in turn, distributes the fluid communications to each fluid pressure canister 22, thereby creating pressure within fluid pressure canisters 22.

In an alternate embodiment, system 10 utilizes conduits 34 to connect control box 28 to one fluid pressure canister 22 of each lifting mechanism 16, and to serially connect each fluid pressure canister 22 within lifting mechanism 16. Thus, control box 28 provides and controls fluid communications between control box 28 and each lifting mechanism 16 by fluidly communicating with each fluid pressure canister 22 within each lifting mechanisms in a serial fashion.

Figure 2:
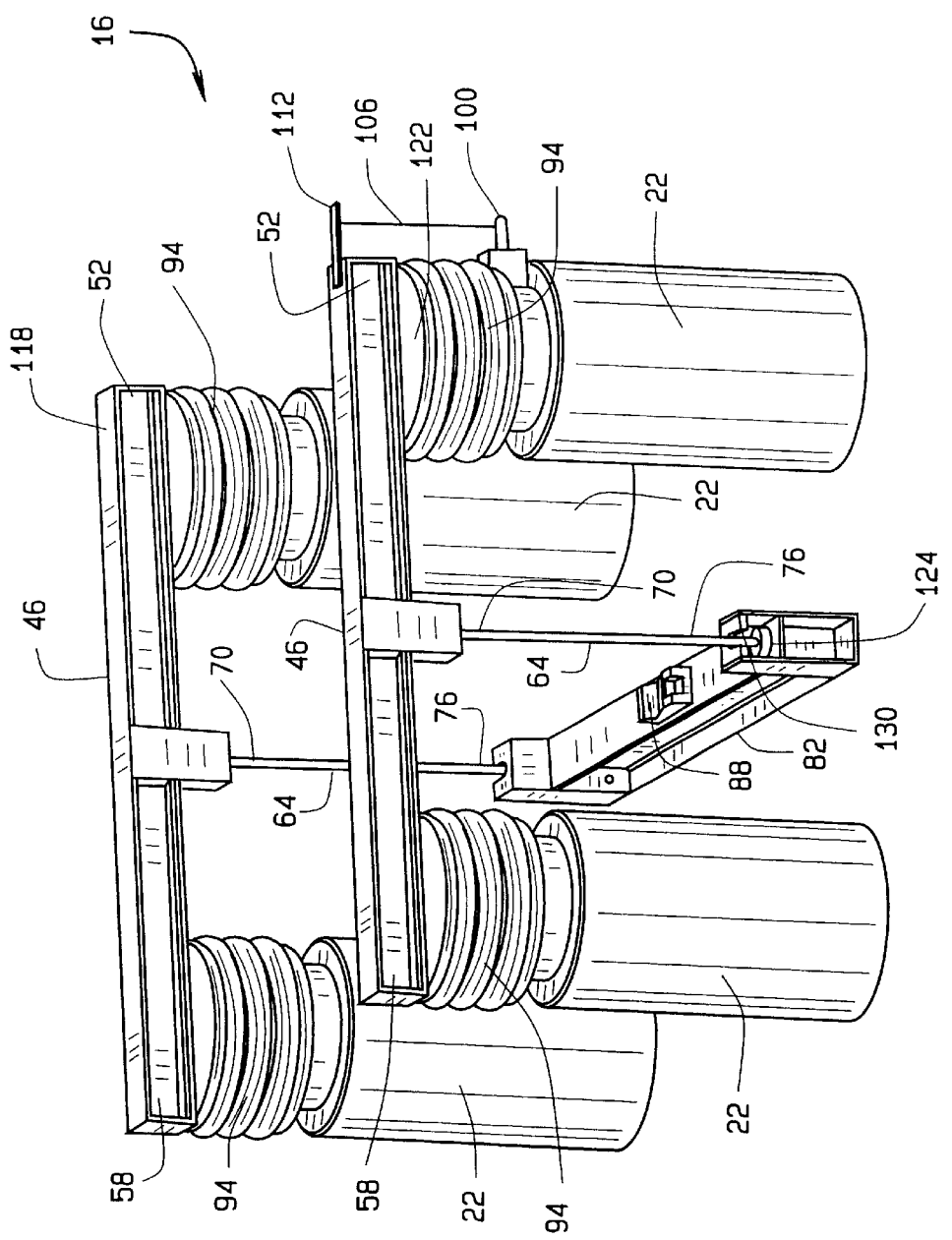
FIG. 2 is a perspective view of a lifting mechanism used in the soft support system 10, shown in FIG. 1.

FIG. 2 is a perspective view of a lifting mechanism 16 used in soft support system 10 (shown in FIG. 1). Lifting mechanism 16 includes a plurality of hanger beams 46 having a first end 52 and a second end 58. First end 52 of each hanger beam 46 is coupled to one fluid pressure canister 22 and second end 58 is coupled to another fluid pressure canister 22. FIG. 2 shows lift mechanism 16 having four fluid pressure canisters 22 with each hanger beam 46 coupled to fluid pressure canisters 22 such that first end 52 of each hanger beam 46 is coupled to a separate and distinct fluid pressure canister 22, and each second end 58 is coupled to other separate and distinct fluid pressure canisters 22. However, it should be appreciated that each lift mechanism can include greater or fewer than four fluid pressure canisters 22. For example, lift mechanism 16 could include three fluid pressure canisters 22 such that first ends 52 of each hanger beam 46 are coupled to a separate and distinct fluid pressure canister 22 while second ends 58 of each hanger beam 46 are coupled to one common fluid pressure canister 22.

Lifting mechanism 16 further includes a plurality of hanger rods 64 each having a proximal end 70 and a distal end 76. Hanger rods 70 are pendulously coupled to hanger beams 46 whereby proximal end 70 of each hanger rod 64 is coupled to hanger beam 46 in a pivotal fashion, for example using a ball and socket. In this manner, the distal end 76 of each hanger rod 64 is free to swing to and fro in a three hundred and sixty degree range of motion.

Distal end 76 of each hanger rod 64 is coupled to a lift beam 82 such that lift beam 82 is suspended from hanger beams 46 in a pendulous manner. Thus, each hanger rod 64 is pivotally coupled at proximal end 70 to a single respective hanger beam 46 and pivotally coupled at distal end 76 to an end of lift beam 82. Thus, that lift beam is pendulously suspended between hanger beams 46.

In one preferred embodiment, lifting mechanism 16 comprises four fluid pressure canisters 22, a first hanger beam 46 coupled to two fluid pressure canisters 22, and a second hanger beam 46 coupled to the remaining two fluid pressure canisters 22. A first hanger rod 64 is pivotally coupled at proximal end 70 to the first hanger beam 46 and pivotally coupled at distal end 76 to one end of lift beam 82. A second hanger rod 64 is pivotally coupled at proximal end 70 to the second hanger beam 46 and pivotally coupled at distal end 76 to the opposing end of lift beam 82. This arrangement pendulously suspends lift beam 82 between and below hanger beams 46. Lift beam 82 includes a bearing plate 88 that attaches, or cradles, designated jack points of the flexible structure (not shown).

Each fluid pressure canister 22 includes a bellows 94 and a limit switch 100. As control box (shown in FIG. 1) provides and controls fluid communication to each lifting mechanism 16, via fluid communication conduits 34 (shown in FIG. 1), the fluid communication is distributed to each fluid pressure canister 22 creating fluid pressure within each fluid pressure canister 22. In the preferred embodiment the fluid pressure is air pressure. However, in alternate embodiments the fluid pressure can comprise any other type of fluid pressure such as water pressure or oil pressure. As the fluid pressure inside each fluid pressure canister 22 increases, the related bellows 94 expands upward thereby creating the potential for each lifting mechanism 16 to impart an upward force on the flexible structure sufficient to lift the flexible structure off the ground.

Limit switches 100 control the height of expansion of bellows 94 by controlling flow of fluid into each fluid pressure canister 22. Each limit switch 100 lets fluid in and out of a respective fluid pressure canister 22 based on a predetermined height of expansion of bellows 94, which in turn determines the height the flexible structure is lifted off the ground. Once each bellows 94 is expanded to the predetermined height, the respective limit switch 100 stops the flow of fluid into fluid pressure canister 22. If a leak of fluid pressure in fluid pressure canister 22 occurs, or bleed down in one of the fluid communication conduits 34 occurs, limit switch will continue to let fluid flow into fluid pressure canister 22 to maintain the desired height to which bellows 94 is expanded. In one preferred embodiment, the limit switch is mechanically operated using a stop chain 106 that is attached at one end to limit switch 100 and at the other end to a stop rod 112, which is attached to a top surface 118 of each hanger beam 46, or alternatively to a top surface 122 of bellows 94.

When bellows 94 is in a non-expanded position, stop chain 106 is connected between limit switch 100 and stop rod 112 having slack. As bellows 94 expands, the slack is stop chain 106 is reduced until stop chain 106 is pulled tight between limit switch 100 and stop rod 112, at which point stop chain 106 mechanically operates limit switch 100 such that fluid flow into fluid pressure canister 22 is stopped. If fluid pressure inside fluid pressure canister 22 decreases, slack is created in stop chain 106 which mechanically operates limit switch 100 such that fluid is allowed to flow into fluid pressure canister 22. In an alternate embodiment, the limit switch is an electronically operated switch, such as a piezo switch, or a microprocessor based switch.

A preferred embodiment of the present invention is further described below referring to the flexible structures as aircraft. However, it should be appreciated that the present invention is applicable to many other large flexible structures, such as motor vehicles or space station modules, and the reference to the flexible structures as aircraft should not be construed as limiting the applicability of system 10 to only aircraft.

Ground vibration test of an aircraft can be performed on the tarmac or in the factory. It is typically performed on a first aircraft model, and the Federal Aviation Administration requires that the testing be completed prior to first flight to show the aircraft will be free from flutter, i.e. vibration problems. The test is performed by placing accelerometers at various locations on the aircraft, then attaching electromagnetic shakers to the aircraft which impart a known input force. Frequency response flexion data is then collected, via the accelerometers, and compared to a finite element model created by aircraft design engineers.

The finite element model is a linear model, however real world aircraft flight is seldom linear. Therefore, during vibration testing it is important to remove as many nonlinearities, i.e. aspects of the test that cause nonlinear data, as possible. In other words it is critical to make the testing system as linear as possible, thereby reducing nonlinearities that will contaminate the data and make if very difficult to compare the data to the model.

During testing, the same as during flight, the aircraft exhibits either flexible modes or rigid body modes. Rigid body modes are modes where the aircraft moves as a whole, (i.e. it is not flexing). It is moving strictly all together forward and aft, or sideways, or vertical, or rolling, or pitching. There are six major rigid body modes. The vibration frequency during rigid body modes is much higher when the aircraft is sitting on the ground than when the aircraft is in flight. Flexible modes are modes when parts of the aircraft, such as the wings, are flexing. Flexible mode data is the data of interest during ground vibration testing. However, when the aircraft is on the ground, the higher rigid body mode frequencies fall within the range of flexible mode data, thereby contaminating the data that is critical to analysis. Soft support system 10 simulates an aircraft in flight by pendulously suspending the aircraft from the lifting mechanisms 16. Therefore, the rigid body mode test data produced during testing will have a frequency lower than the flexible mode data, which allows an engineer analyzing the data to separate, or decouple, the rigid body mode data from the flexible mode data. By isolating the flexible mode data, very accurate test results are acquired.

Soft support system 10 has a reduced mass with respect to known structural support systems. This reduction in weight significantly increases the separation of the rigid body modes from the first flexible modes in the resulting test data. Thus the model verification process is greatly enhanced and in many cases the previously near impossible task of interpreting and verifying the test data is made very manageable. The bulk of the reduction in weight is accomplished by replacing platform type lifting structures of typical known support systems with light weight hanger beams 46 and lift beams 82. At each jack point on the aircraft landing gear, the platform of known support systems is replaced by lifting beam 82, which is installed between the tires of the landing gear and attached at the jack point using bearing block 88.

Additionally, by placing lift beams 82 between the tires and lifting the aircraft by jack points on the struts, soft support system 10 removes the nonlinearities of the aircraft tires from the load path. The beam is installed between the tires and is attached with bearing block 88 to the jack points on the aircraft struts. Therefore, when the bellows 94 expands, the aircraft is lifted off the ground by lift beams 82 such that the tires are hanging free from load and all the weight is placed at the jack joints. This allows the analysis model to be reliably defined using the landing gear characteristics created by removing the tire nonlinearities. Removing the tire nonlinearities reduces the significant uncertainty in the analysis correlation work.

Furthermore, soft support system 10 significantly reduces the setup time with respect the set up time of known support systems. The lifting mechanisms 16 are assembled adjacent, or around, each landing gear. A lift beam is installed between the tires of each landing gear while the plane is on the ground. Therefore, the aircraft does not need to be jacked up in order to place the platforms of known support structures under the landing gear. Soft support system 10 also reduces the risk of damage to the aircraft caused by improper jacking.

When soft support system 10 is utilized to perform structural testing of an aircraft having three landing gears, i.e., two main landing gears and a nose landing gear, three lifting mechanisms 16 are utilized, one at each landing gear. Each lifting mechanism 16 is constructed adjacent, or around, each landing gear while the aircraft remains on the ground. To assemble lifting mechanism 16, lift beam 82 is slid between the tires of the landing gear and aligned, along with bearing block 88, with the landing gear strut. Fluid pressure canisters 22 are symmetrically placed about each landing gear and hanger beams 46 are coupled to a pair of fluid pressure canisters 22, such that hanger beams 46 run inboard and outboard perpendicular to the aircraft fuselage.

Next, hanger rods 64 are pendulously coupled to hanger beams 46 at proximal ends 70 and pivotally coupled to lift beam 82 at distal ends 76. In one embodiment, each hanger rod 64 includes a disc, or "puck", 124 at distal ends 76, which are inserted into slots 130 located at each end of lift beam 82, thereby pivotally coupling distal ends 76 to lift beam 82. In this embodiment, the proximal ends 70 of hanger rods 64 are threaded and screwed into hanger beams 46 between fluid pressure canisters 22.

After lifting mechanisms 16 are assembled adjacent each landing gear, fluid communication conduits 34 are installed, thereby interconnecting each fluid pressure canister 22 within each lifting mechanism 16, and connecting control box 28 to each lifting mechanism 16. Limit switches 100 are then installed and adjusted so that the aircraft will lift off the ground a predetermined distance, for example one to two inches. Finally, a fluid source is supplied to main control box 28, which in turn supplies the fluid source to each lifting mechanism 16. Regulators 30 regulate the flow of fluid communications so that fluid pressure inside each fluid pressure canister 22 increases uniformly. Therefore, each lifting mechanism 16 will impart an upward force at each strut in a uniform manner, and lift the aircraft off the ground in a stable and controlled fashion.

Figure 3:
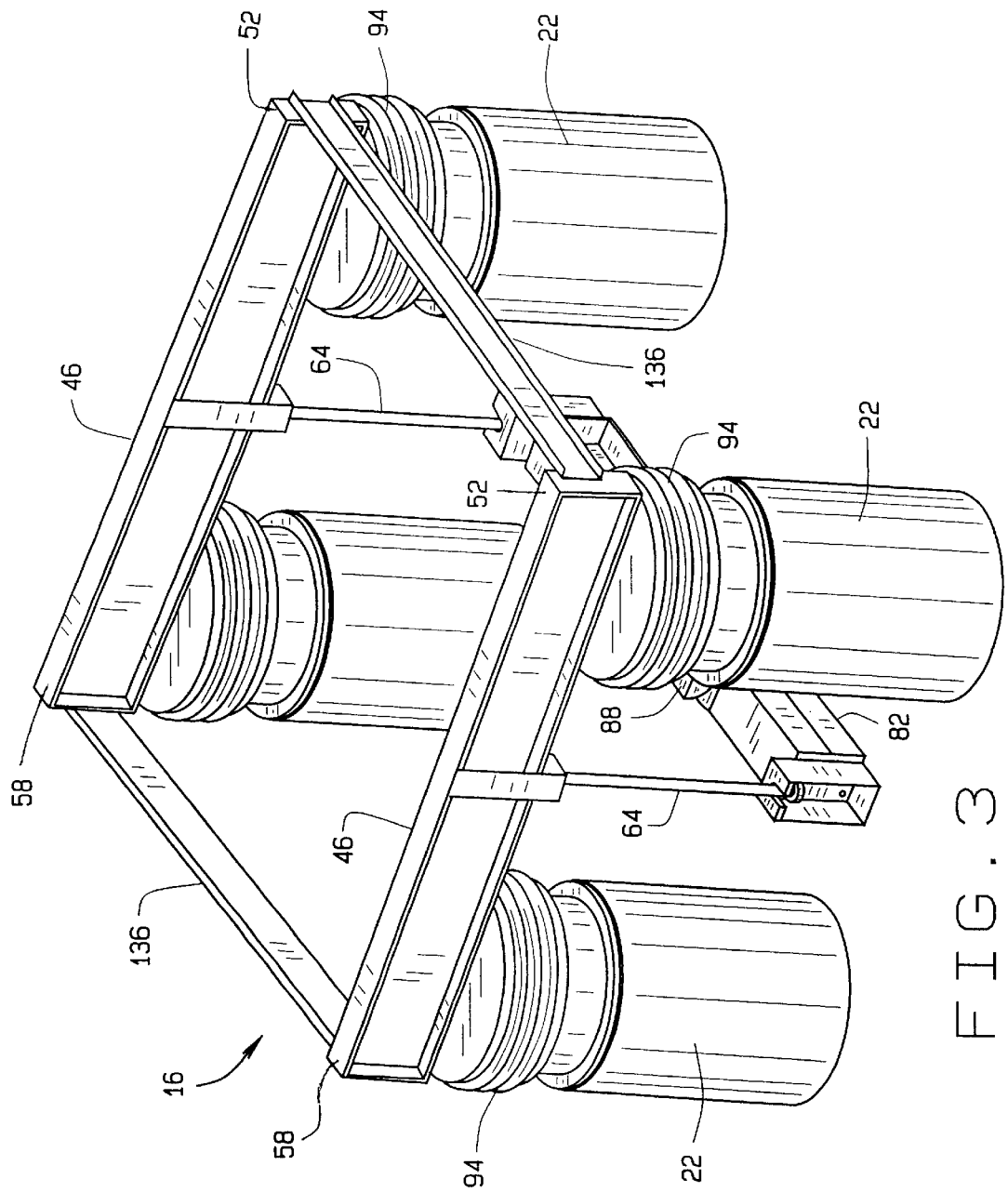
FIG. 3 is perspective view of an alternate embodiment of the lifting mechanism shown in FIG. 2.

FIG. 3 is perspective view of an alternate embodiment of lifting mechanism 16 (shown in FIG. 2), wherein lifting mechanism 16 includes at least one racking beam 136. Each racking beam 136 is connected between hanger beams 46. As shown in FIG. 3, lifting mechanism 16 includes two racking beams 136, one coupled to the first ends 52 of two hanger beams 46, and a second coupled to the second ends 58 of the two hanger beams, thereby maintaining the hanger beams 46 a specified distance apart. In addition to maintaining a specified distance between hanger beams 46, racking beams 136 provide lifting mechanism 16 with additional strength and rigidity needed to support jacking points on a flexible structure that are exceptionally heavy. In the case of an aircraft, the preferred embodiment includes racking beams 136 in the lifting mechanisms 16 assembled adjacent each of the main landing gear, while the lifting mechanism assembled adjacent the nose gear does not include racking beams 136.

The invention therefore, allows a large flexible structure, such as an aircraft, to be pendulously suspended so that ground vibrations testing produces resulting rigid body test mode data which can be decoupled from resulting first flexible mode test data.

While the invention has been described in terms of various specific embodiments, those skilled in the art will recognize that the invention can be practiced with modification within the spirit and scope of the claims.

What is claimed is:

1. A support system for ground vibration testing of a large flexible structure, said system comprising:
    a plurality of light weight lifting mechanisms configured to impart an upward force sufficient to lift said flexible structure off the ground; and
    a plurality of lift beams coupled to said lifting mechanisms in a pendulous manner, each said lift beam configured to attach to said flexible structure at one of a plurality of designated jack points, and to lift said flexible structure off the ground when the upward force is imparted by said lifting mechanisms, thereby pendulously suspending said flexible structure above the ground such that rigid body mode test data is decoupled from first flexible mode test data.

2. The system of claim 1 further comprising a control box configured to control the lifting force imparted by each said lifting mechanism, wherein each of said lifting mechanisms comprises:
    a plurality of fluid pressure canisters; and
    a plurality of fluid communication conduits connecting each said lifting mechanism to said control box and interconnect said fluid pressure canisters within each said lift mechanism, thereby allowing fluid communication between said control box and said lift mechanism, and between said fluid pressure canisters within said lift mechanism.

3. The system of claim 2 wherein said control box comprises at least one regulator per lifting mechanism, each said regulator configured to control the fluid communications between said control box and one of said lifting mechanisms.

4. The system of claim 2 wherein each said lifting mechanism further comprises:
    a plurality of hanger beams having a first end coupled to one of said fluid pressure canisters and a second end coupled to another of said fluid pressure canisters; and
    a plurality of hanger rods configured to pendulously couple one of said lift beams to said hanger beams.

5. The system of claim 4 wherein at least one of said lifting mechanisms further comprises at least racking beam connected between said hanger beams.

6. The system of claim 2 wherein each of said fluid pressure canisters comprises a limit switch configured to control a fluid pressure inside the respective fluid pressure canister.

7. The system of claim 6 wherein said fluid pressure comprises air pressure.

8. The system of claim 6 wherein said fluid pressure comprises water pressure.

9. The system of claim 6 wherein said fluid pressure comprises oil pressure.

10. The system of claim 1 wherein each said lift beam comprises a bearing block configured to attach each said lift beam to said flexible structure at one of said designated jack points.

11. The system of claim 1 wherein said flexible structure comprises an aircraft, said aircraft comprising a plurality of landing gears wherein each said landing gear comprises a landing gear strut and a plurality of tires.

12. The system of claim 1 wherein each said lift beam is further configured to attach to one of said landing gear struts between said tires such that said system lifts the aircraft off the ground by said landing gear struts, thereby removing tire stiffness nonlinearities from test results.

13. A method for structurally testing a flexible structure using a soft support system, the system including a plurality of light weight lifting mechanisms and a plurality of lift beams pendulously coupled to the lifting mechanisms, said method comprises;
   attaching the lift beams to the flexible structure at designated jack points; and
   pendulously suspending the flexible structure above the ground utilizing the lift beams and lifting mechanisms such that rigid body mode test data is decoupled from first flexible mode test data.

14. The method of claim 13 wherein each lift beam includes a bearing block, and wherein attaching the lift beams to the flexible structure comprises attaching the bearing blocks to the designated jack points of the flexible structure.

15. The method of claim 13 wherein each of the lifting mechanisms includes a plurality of fluid pressure canisters, a plurality of hanger beams and a plurality of hanger rods, each fluid pressure canister including a bellows and a limit switch, and wherein pendulously suspending the flexible structure comprises:
   assembling one of the lifting mechanisms adjacent each jack point; and
   imparting an upward force on the jack points utilizing the lift beams and the lifting mechanisms, thereby lifting the flexible structure off the ground.

16. The method of claim 15 wherein assembling one of the lifting mechanisms comprises:
   connecting a first end of each hanger beam to one of the fluid pressure canisters;
   connecting a second end of each hanger beam to another of the fluid pressure canisters;
   pendulously connecting one of the lift beams to the hanger beams using the hanger rods.

17. The method of claim 15 wherein the system further includes a control box for controlling fluid communications between the control box and each lifting mechanism, and wherein each lifting mechanism further includes a plurality of fluid communication conduits connecting the control box to the lifting mechanism and interconnecting the fluid pressure canisters, and wherein imparting an upward force comprises:
   supplying fluid communication to the lifting mechanism utilizing the control box and the fluid communication conduits;
   creating a fluid pressure within each fluid pressure canister using the supplied fluid communication, thereby causing the bellows to expand and impart an upward force on the jack points; and
   controlling the fluid pressure within each fluid pressure canister using the related limit switch.

18. A support system for ground vibration testing of an aircraft having a plurality of land gears, each landing gear comprising a landing gear strut and a plurality of tires, said system comprising:
   a plurality of fluid pressure canisters configured to impart an upward force at each said landing gear strut, said force sufficient to lift said aircraft;
   a plurality of hanger beams having a first end coupled to one of said fluid pressure canisters and an opposing second end coupled to another of said fluid pressure canisters;
   a plurality of hanger rods coupled to said hanger beams such that a proximal end of each said hanger rod is pendulously coupled to a respective one of said hanger beams between said first end and said second end; and
   a plurality of lift beams connected to said hanger rods such that one said lift beam is connected to a distal end of two said hanger rods, each said lift beam configured to attach to one of said landing gears between said tires such that said aircraft is pendulously suspended above the ground when said fluid pressure canisters impart the upward force, thereby allowing test data to be produced wherein rigid body mode test data is decoupled from first flexible mode test data.

19. The system of claim 18 further comprising:
   a control box; and
   a plurality of fluid communication conduits connecting said control box to said fluid pressure canisters and interconnecting said fluid pressure canisters, said control box configured to control fluid communications to said fluid pressure canisters through said fluid communication conduits, thereby creating a fluid pressure within each said fluid pressure canister.

20. The system of claim 19 wherein each said fluid pressure canister comprises a bellows configured to expand as fluid pressure is created within each said fluid pressure canister, thereby imparting an upward force on said landing gear struts via said lift beams; and
   a limit switch configured to control the fluid pressure within each said fluid pressure canister.

* * * * *